United States Patent
Zhang et al.

(10) Patent No.: US 9,263,748 B2
(45) Date of Patent: *Feb. 16, 2016

(54) REVERSAL TOLERANT MEMBRANE ELECTRODE ASSEMBLY FOR A FUEL CELL

(71) Applicants: Daimler AG, Stuttgart (DE); Ford Motor Company, Dearborn, MI (US)

(72) Inventors: Hao Zhang, Burnaby (CA); Herwig Haas, New Westminster (CA); Sumit Kundu, Burnaby (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/615,577

(22) Filed: Feb. 6, 2015

(65) Prior Publication Data

US 2015/0155567 A1   Jun. 4, 2015

Related U.S. Application Data

(63) Continuation-in-part of application No. 13/143,372, filed as application No. PCT/US2010/020466 on Jan. 8, 2010, now Pat. No. 8,968,960.

(60) Provisional application No. 61/193,913, filed on Jan. 8, 2009.

(51) Int. Cl.

| | | |
|---|---|---|
| H01M 4/92 | (2006.01) | |
| H01M 4/48 | (2010.01) | |
| H01M 8/10 | (2006.01) | |
| H01M 4/02 | (2006.01) | |
| H01M 4/36 | (2006.01) | |
| H01M 4/94 | (2006.01) | |
| H01M 4/86 | (2006.01) | |
| H01M 8/18 | (2006.01) | |
| H01M 4/88 | (2006.01) | |

(52) U.S. Cl.
CPC .......... *H01M 4/8652* (2013.01); *H01M 4/8825* (2013.01); *H01M 4/921* (2013.01); *H01M 4/925* (2013.01); *H01M 8/186* (2013.01); *H01M 2004/8684* (2013.01); *H01M 2008/1095* (2013.01)

(58) Field of Classification Search
USPC ................. 429/487, 488, 523, 526, 535, 525; 427/115
IPC .............................................. H01M 4/92,4/921
See application file for complete search history.

(56) References Cited

U.S. PATENT DOCUMENTS 7,976,989 B2 * 7/2011 Lopez et al. .................. 429/400

\* cited by examiner

*Primary Examiner* — Patrick Ryan
*Assistant Examiner* — Julian Anthony
(74) *Attorney, Agent, or Firm* — Stephan A. Pendorf; Patent Central LLC (57) ABSTRACT

A membrane electrode assembly (MEA) for a fuel cell which exhibits enhanced reversal tolerance. In particular, a layer of iridium or an iridium compound, preferably metallic iridium or iridium oxide supported on $TiO_2$, is provided on the anode to electrolyze available water and pass the majority of the current during a reversal of the fuel cell, thereby preventing damage to the MEA. The iridium or iridium compound is applied to an anode structure according to a predetermined pattern, with only part of the anode active area containing Ir. The parts of the MEA that do not contain Ir are not expected to suffer degradation from Ir cross-over, so that overall degradation of the cell will be diminished. Having less precious metals will also translate into less cost.

16 Claims, 9 Drawing Sheets

REVERSAL TOLERANT MEMBRANE ELECTRODE ASSEMBLY FOR A FUEL CELL

CROSS-REFERENCE TO RELATED APPLICATIONS

This is a continuation-in part of U.S. application Ser. No. 13/143,372 filed Jul. 6, 2011, which is a US National Stage of PCT/US10/20466 filed. Jan. 8, 2010, which claims benefit from U.S. Provisional Application 61/193,913 filed Jan. 8, 2009.

BACKGROUND OF THE INVENTION (1) Field of the Invention

The present invention is directed to a membrane electrode assembly (MEA) for a fuel cell which exhibits enhanced reversal tolerance. In particular, the invention provides an MEA configuration in which a layer of iridium or an iridium compound, preferably metallic iridium or iridium oxide supported on $TiO_2$, is provided on the anode to electrolyze available water and pass the majority of the current during a reversal of the fuel cell, thereby preventing damage to the MEA.

(2) Description of Related Art

"Reversal" of a fuel cell (in which the cell operates in a regenerative manner, consuming electricity and, for example, electrolyzing water to produce hydrogen and oxygen) can occur during normal fuel cell operation due to "fuel starvation" attributable to poor flow sharing, or to low fuel flow. Fuel starvation can also occur during a shutdown event when the anode is purged with air (to leave the stack in a safe situation or in preparation for freeze start) and load is drawn to additionally bleed down cell voltages. Between start-up and shutdown (if $H_2$ is not purged from the anode) air will permeate into the anode and consume $H_2$ due to small leaks and/or cross-over from the cathode. On the resulting start-up, the exchange of air on the anode with $H_2$ and subsequent load will result in fuel starvation at the cell outlet.

Figure 1:
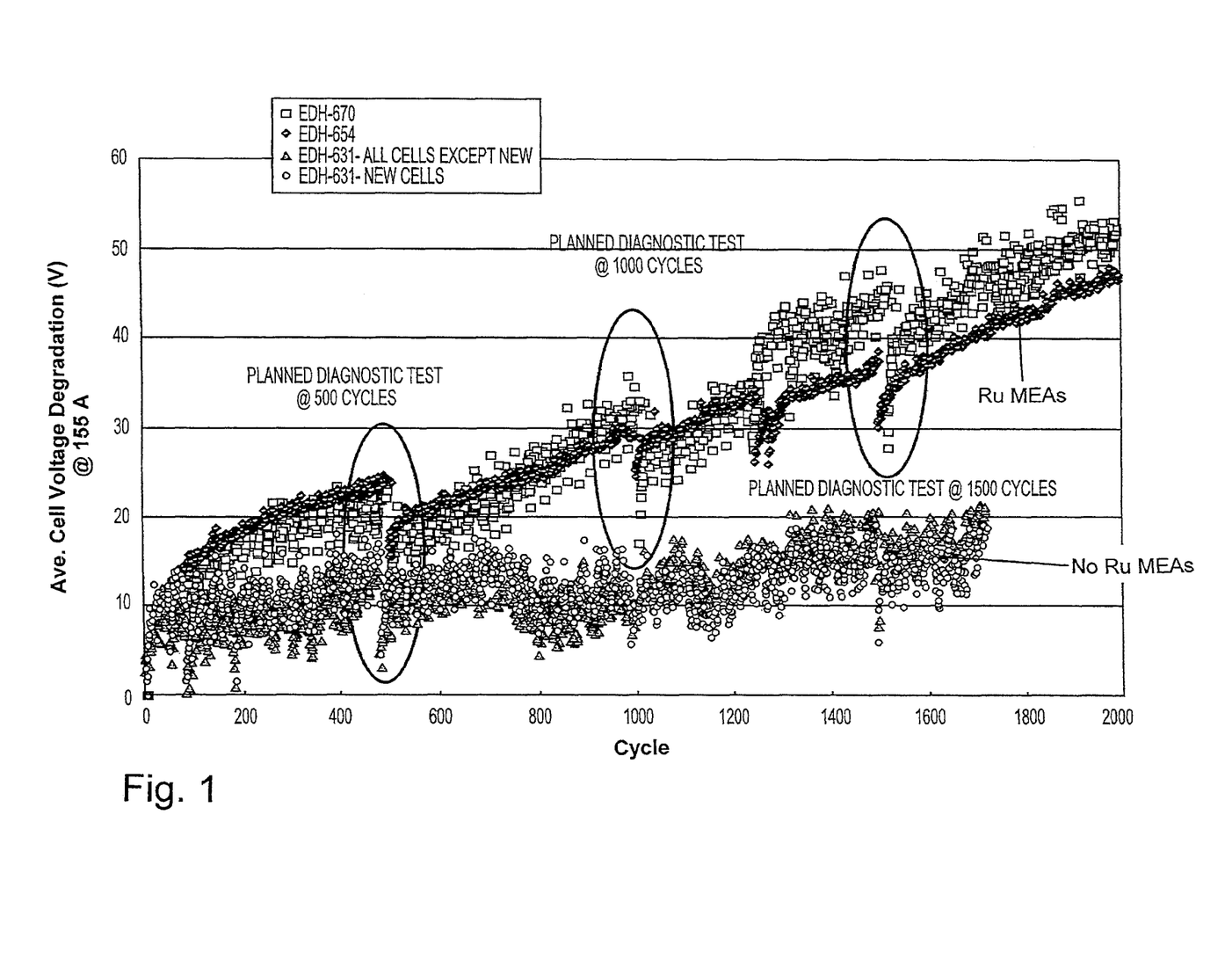
FIG. 1 graphically shows the loss in performance with ruthenium crossover.

In conventional fuel cells which utilize, for example a platinum based anode catalyst, without any provision for reversal tolerance, cell reversal can cause damage to the anode, due to carbon oxidation. Accordingly, it is known to include additional measures which provide the MEA with a degree of "reversal tolerance", thereby avoiding damage to the MEA:

One known technique for achieving reversal tolerance, for example, is to provide a Pt/Ru alloy or admix over the entire surface of the anode structure. However, while this MEA configuration is easy to manufacture, it has a number of disadvantages which render it less than ideal. First, among these is that during operation of the fuel cell, the ruthenium which is applied to the anode can gradually migrate from the anode to the cathode, which over time can contribute substantially to a degradation of the fuel cell output voltage, as can be seen in FIG. 1. Moreover, this technique also requires an excessive amount of costly precious metal.

SUMMARY OF THE INVENTION

Accordingly, one object of the invention is to provide an MEA structure incorporating an oxygen evolution reaction catalyst that achieves satisfactory reversal tolerance, while avoiding the disadvantages described above.

Another object of the invention is to provide an MEA structure which achieves optimal results while decreasing long term degradation due to the cross-over of oxygen evolution reaction catalyst from the anode to the cathode.

Still another object of the invention is to provide such an MEA structure which reduces the amount of an oxygen evolution reaction catalyst that is required to achieve satisfactory reversal tolerance, thereby minimizing cost.

The inventors named in the parent application investigated rutheninum or ruthenium compounds including iridium containing compounds such as RuIrOx as oxygen evolution reaction catalyst, and discovered that the above listed objects could be accomplished by deposition of the oxygen evolution reaction catalyst according to a predetermined pattern, with only part of the anode active area containing oxygen evolution reaction catalyst. The parts of the MEA that do not contain oxygen evolution reaction catalyst compound are not expected to suffer degradation from oxygen evolution reaction catalyst cross-over, so that overall degradation of the cell will be diminished. Having less precious metals will also translate into less cost (given an appropriate manufacturing process).

Iridium and iridium compounds were further investigated for reversal tolerance and durability. It was surprisingly discovered that the reversal tolerance of materials such as metallic iridium and iridium oxide supported on $TiO_2$ when compared with anode containing $RuIrO_x$ with similar loading, i.e., iridium loading in new material is similar to total of Ru and Ir loading in $RuIrO_x$, showed an approximately 15× improvement on extended reversal tolerance.

During reversal, the Pt/Ir regions electrolyze available water and pass the majority of the current thereby protecting/preventing Pt only regions from carbon oxidation. These areas need not be of equal size or may be larger sized in regions of the cell where partial fuel starvation events are more probable (i.e., outlet region). The areas coated with iridium or an iridium compound should be able to carry the current being passed during reversal to prevent hot spots from forming, and not too distantly spaced to induce large in plane currents. Suggested strip width is 2 cm with 5 cm spacing (i.e., Pt strip width=5 cm).

Accordingly, these and other objects and advantages are achieved by the method and apparatus according to the invention, in which iridium or an iridium compound, preferably metallic iridium or iridium oxide supported on $TiO_2$, is applied to the anode structure as an oxygen evolution reaction catalyst according to a predetermined pattern.

BRIEF DESCRIPTION OF THE FIGURES OF THE DRAWING

The present invention is illustrated by way of example and not limitation in the accompanying drawings in which like reference numbers indicate similar parts, and in which:

FIG. 12 is a picture of a CCM with RuIrOx strips and Pt regions in between; and

DETAILED DESCRIPTION OF THE PREFERRED EMBODIMENTS

A fuel cell comprises a membrane electrode assembly, i.e., anode, cathode and an electrolyte membrane arranged between the anode and the cathode. In order to overcome the problems inherent in reversal, such as damage to the anode due to carbon oxidation, and to achieve reversal tolerance while decreasing long term degradation due to cross-over of ruthenium or iridium from the anode to the cathode, the present invention provides an anode with an oxygen evolution reaction catalyst. The oxygen evolution reaction catalyst includes elemental iridium or at least one iridium compound. Among the iridium or iridium compounds preferred are metallic elemental iridium (Ir), iridium (IV) oxide ($IrO_2$), preferably metallic iridium or iridium oxide supported on $TiO_2$, and optionally additionally $RuIrO_x$, where x can vary depending on the respective valences of Ru and Ir. The parts of the MEA that do not contain the oxygen evolution reaction catalyst are not expected to suffer degradation of iridium cross-over, so that overall degradation of the cell will be diminished.

During reversal, the iridium or iridium compound regions electrolyze available water and pass the majority of the current thereby protecting/preventing Pt only regions from carbon oxidation, and limiting overall damage to the anode. The areas containing the iridium or iridium compound need not be of equal size. Some areas can be larger than other areas. Those areas in the regions of the cell where partial fuel starvation events are more probable, e.g., in the outlet region of the anode, are preferably larger. The areas can also be in a pattern, such as a checkerboard or in stripes. The areas coated with the iridium or an iridium compound should be able to carry the current being passed during reversal to prevent hot spots from forming, and not too distantly spaced to induce larger in plane currents. For example, when using strips, the suggested strip width is about 2 cm, with up to 5 cm spacing, i.e., the Pt strip width would be about 5 cm.

The patterns can be applied to the anode, generally the gas diffusion layer of the anode, in two steps. First, the iridium or an iridium compound can be applied to the GDL in the desired pattern, and then the Pt catalyst can be applied to fill in between the iridium or iridium compound areas, or vice-versa. Alternatively, the gas diffusion layer can be coated with the Pt catalyst, and then the iridium or iridium compound applied in a pattern over the Pt catalyst layer.

By employing the reversal tolerance anode of the present invention, one can limit the damage to the anode during reversal. The limited amount of iridium or iridium compound used also provide a fuel cell in which degradation to the cell because of iridium cross-over is diminished. Using less precious metals also translates into less cost.

Turning now to the figures, FIG. 1 shows the loss in performance associated with ruthenium crossover from the anode to the cathode in a conventional MEA stack. This contribution to degradation was proven by comparison of degradation rate using a Pt anode structure.

Figure 2:
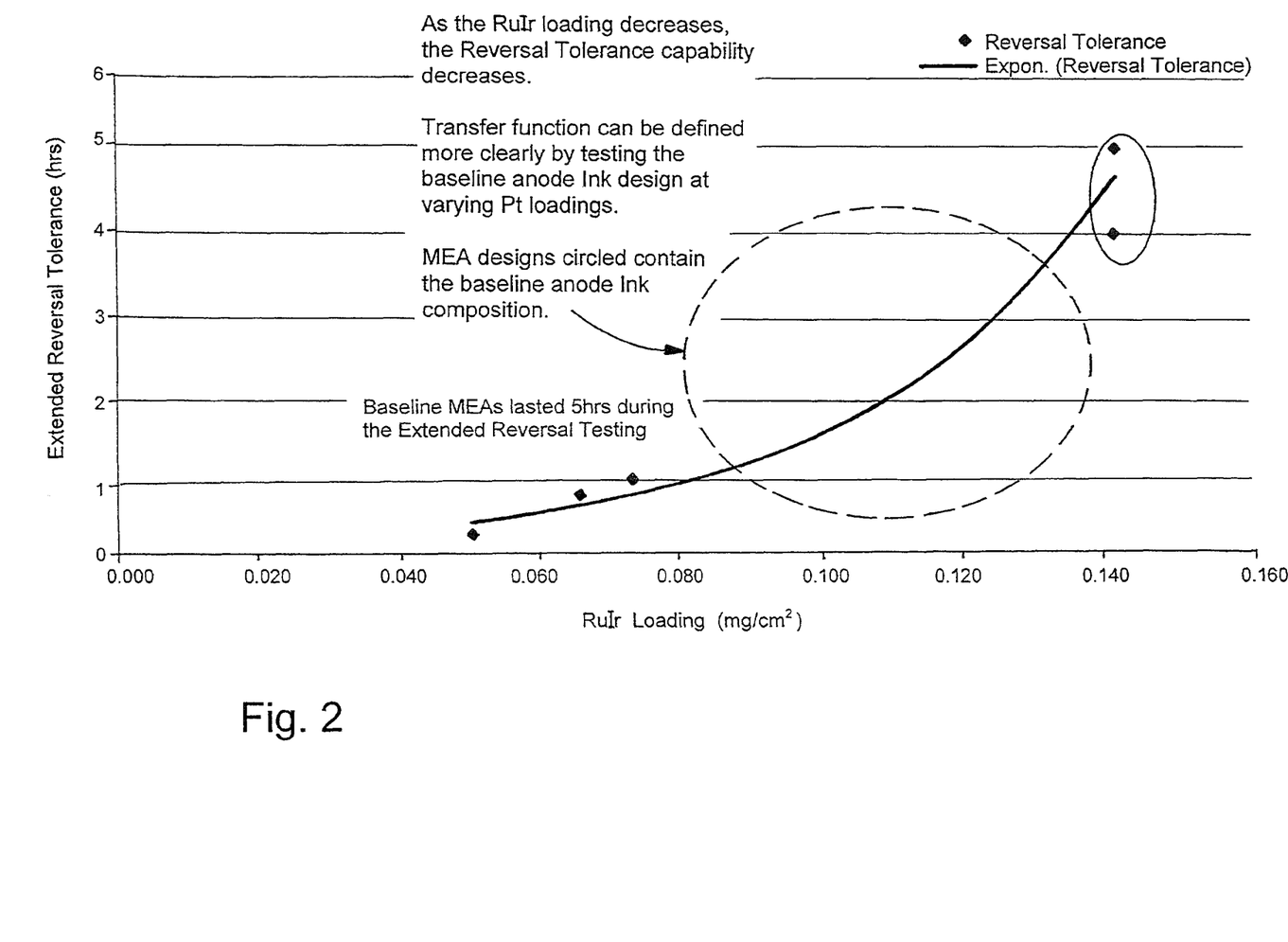
FIG. 2 graphically shows the trade-off with required reversal tolerance as a function of ruthenium loading at the anode.

FIG. 2 shows the trade-off with required reversal tolerance as a function of ruthenium loading at the anode. As shown, some oxygen evolution reaction catalyst, which in this case is ruthenium, is necessary at the anode to limit the damage caused by carbon oxidation during cell reversal. Causes of reversal due to fuel starvation can occur during operation with poor flow sharing or low fuel flow. Fuel starvation can also occur during a shutdown event when the anode is purged with air (to leave the stack in a safe situation or in preparation for freeze start) and load is drawn to additionally bleed down cell voltages. Between start-up and shutdown (if $H_2$ is not purged from the anode) air will permeate into the anode and consume $H_2$ due to small leaks and/or cross-over from the cathode. On the resulting start-up, the exchange of air on the anode with $H_2$ and subsequent load will result in fuel starvation at the cell outlet. The following pictures describe and show various anode concepts and prototypes which compare ruthenium and iridium as oxygen evolution reaction catalyst, and balance the requirement of reversal tolerance while minimizing overall ruthenium or iridium deposit to prevent excessive degradation at the cathode.

Figure 3:
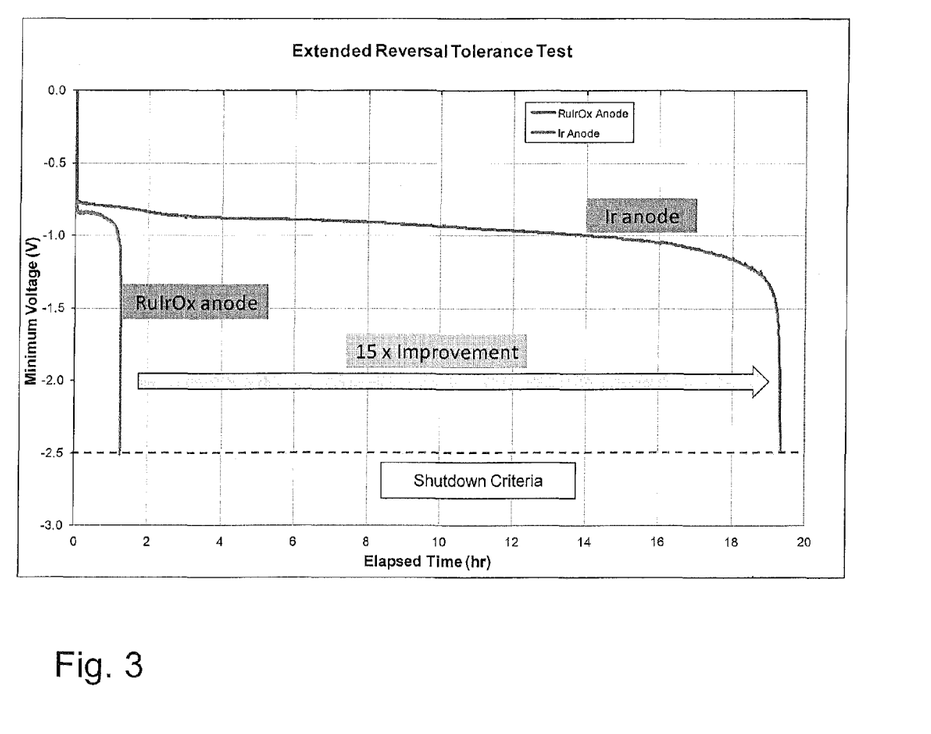
FIG. 3 shows an extended reversal tolerance test comparing an iridium loaded anode against an RuIrOx loaded electrode.

Iridium and iridium compounds were further investigated for reversal tolerance and durability. The reversal tolerance of materials such as metallic iridium and iridium oxide supported on $TiO_2$ were evaluated and compared to an anode containing $RuIrO_x$ with similar loading, i.e., iridium loading in new material is similar to total of Ru and Ir loading in RuIrOx. FIG. 3 shows the comparison for extended reversal tolerance. The new Ir material showed ~15× improvement on extended reversal tolerance.

Figure 4:
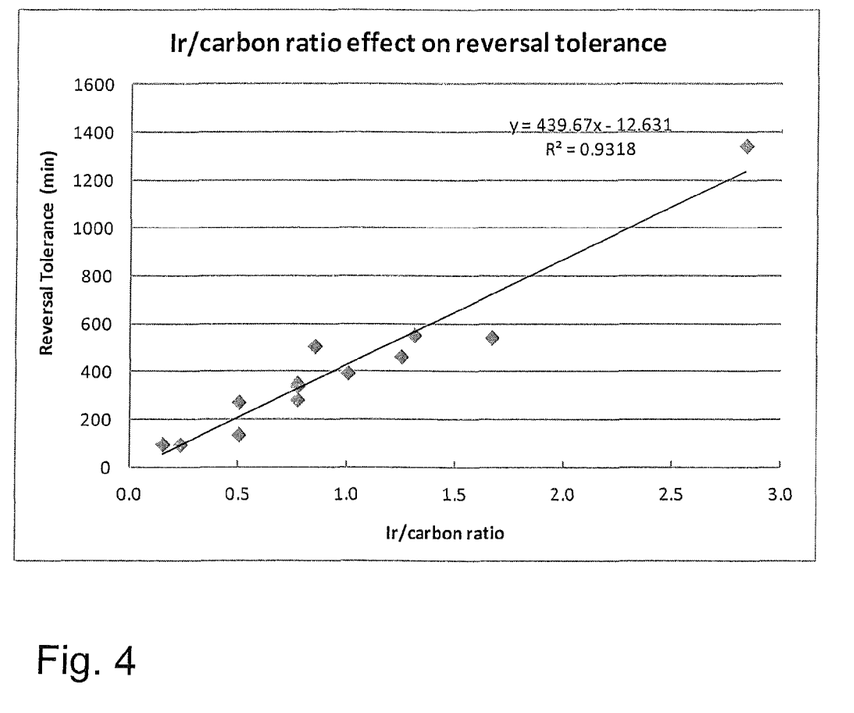
FIG. 4 shows the iridium/carbon ratio effect on reversal tolerance.

During the development of the anode with iridium or iridium compound as oxygen evolution reaction catalyst, it was found that Ir/carbon (carbon is from hydrogen oxidation reaction (HOR) catalyst, i.e. Pt/carbon) ratio has big impact on reversal tolerance. FIG. 4 shows the effect of Ir/carbon (or Ir/Pt) ratio on reversal tolerance. There are many hypotheses for the explanation. While not being bound by any theory of the invention, one hypothesis is that this Ir containing oxygen evolution reaction (OER) catalysts is characterized by big particles (several nm to several hundred nm in diameter), and is very electrically conductive (~5-6× higher than EA type carbon). A higher Ir/carbon ratio means less carbon if Ir loading is constant, therefore, the catalyst layer is thinner and the connectivity of the big chunk of OER catalyst is better, which could maintain electron conduction during a reversal event despite of carbon corrosion, eventually leading to longer reversal time. The benefit of this unique phenomenon makes it possible to reduce the total cost with improved reversal tolerance.

Figure 5:
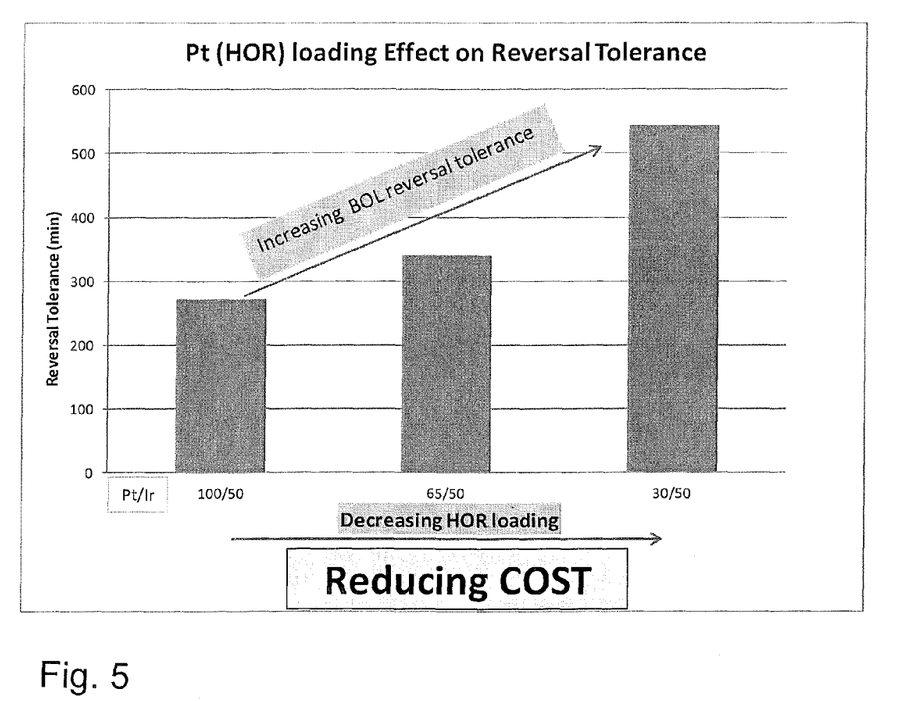
FIG. 5 shows the benefit of increasing reversal tolerance with decreasing platinum loading.

FIG. 5 shows that reversal tolerance increases with decreasing Pt loading.

In summary, the benefit of introducing Ir containing OER catalyst to the anode includes:

1) improved reversal tolerance;

2) potential to reduce the cost with increased reversal tolerance; and 3) potentially increased durability.

Figure 6:
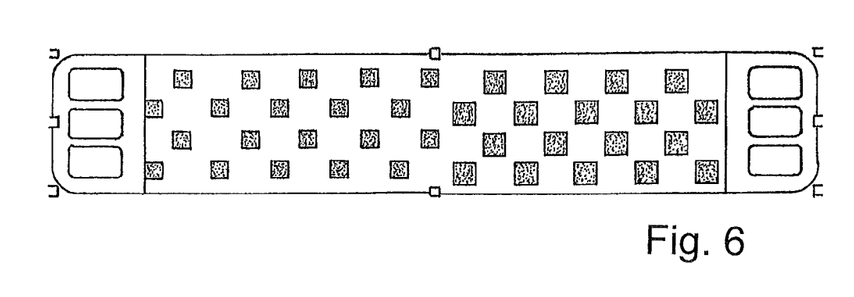
FIG. 6 shows a spotted design embodiment of the present invention.

FIG. 6 shows a spotted design concept, patches are appropriately spaced with greater area at the outlet region (right hand side) where fuel starvation is more likely. By assumption, Ru crossover to the cathode occurs opposite to each patch. If the Ru can spread in-plane, then the spacing of each anode patch should be greater than the Ru diffusion distance but less than the distance that current can distribute in-plane.

While this figure was prepared with ruthenium as the oxygen evolution reaction catalyst, the same principles apply when using iridium or an iridium compound as oxygen evolution reaction catalyst.

Figure 7:
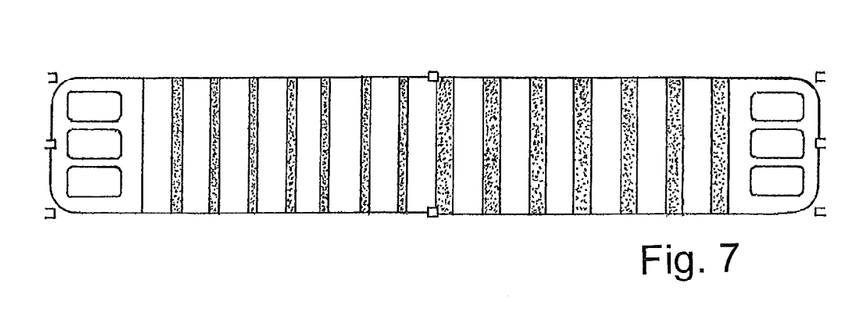
FIG. 7 shows another design embodiment of the present invention involving strips of an iridium compound.

FIG. 7 shows another concept where RuIrOx patches are placed in strips. The principle applies to iridium or an iridium compound as oxygen evolution reaction catalyst.

Figure 8:
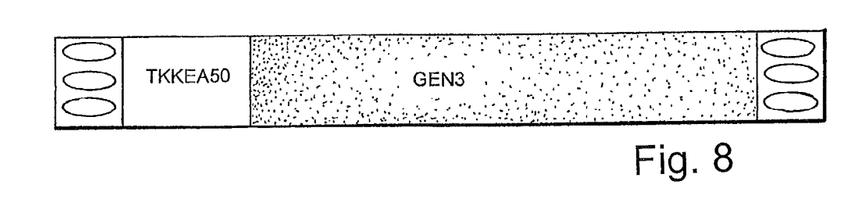
FIG. 8 is a schematic of an anode containing a ruthenium compound coated on 75% of its area closest to the outlet.
Figure 9:
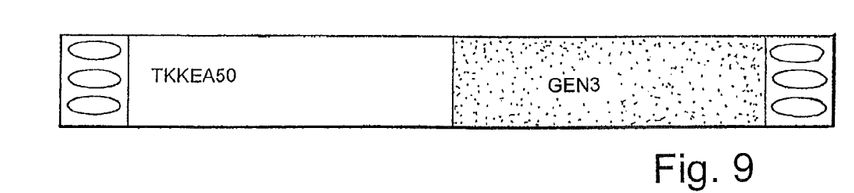
FIG. 9 is a schematic of an anode containing a ruthenium compound coated on 50% of its area closest to the outlet.
Figure 10:
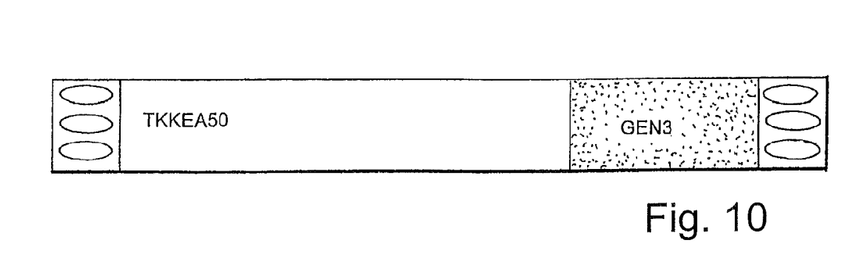
FIG. 10 is a schematic of an anode containing a ruthenium compound coated on 25% of its area closest to the outlet.

In FIGS. 8-10 RuIrOx is localized at certain areas which may be prone to fuel starvation. RuIrOx is coated at 75%, 50% and 25% of the area close to the outlet, respectively. Again, the principle applies with iridium or an iridium compound as oxygen evolution reaction catalyst.

Figure 11:
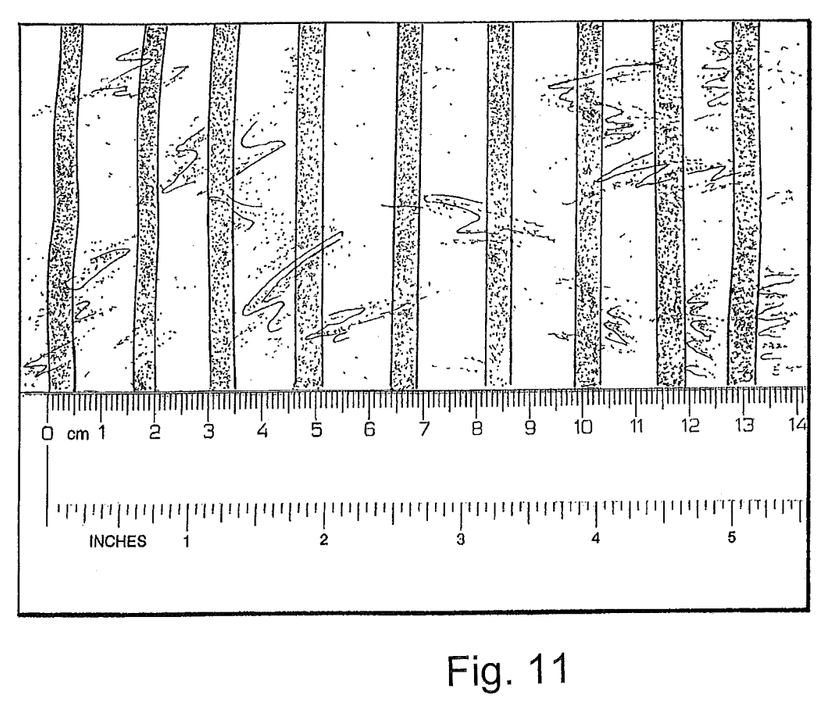
FIG. 11 is a picture of an anode mode with ruthenium compound patches.

FIG. 11 is a picture of a prototype made with Ru patches. A subsequent decal step would fill in the uncoated region with Pt catalyst as shown in FIG. 9. A prototype made with iridium or an iridium compound as oxygen evolution reaction catalyst mayd have the identical appearance.

Figure 12:
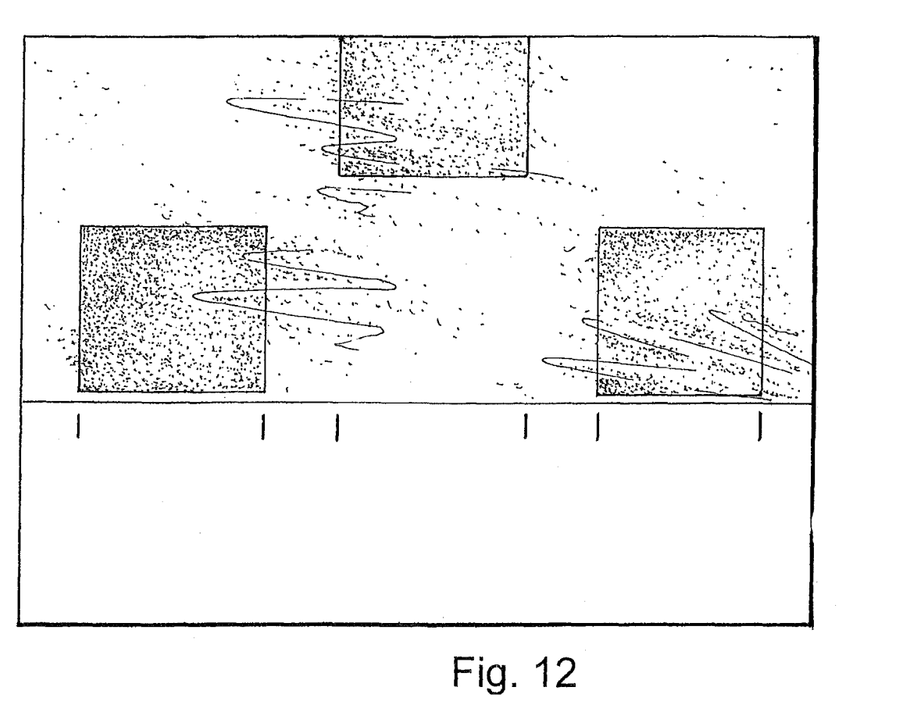
Figure 13:
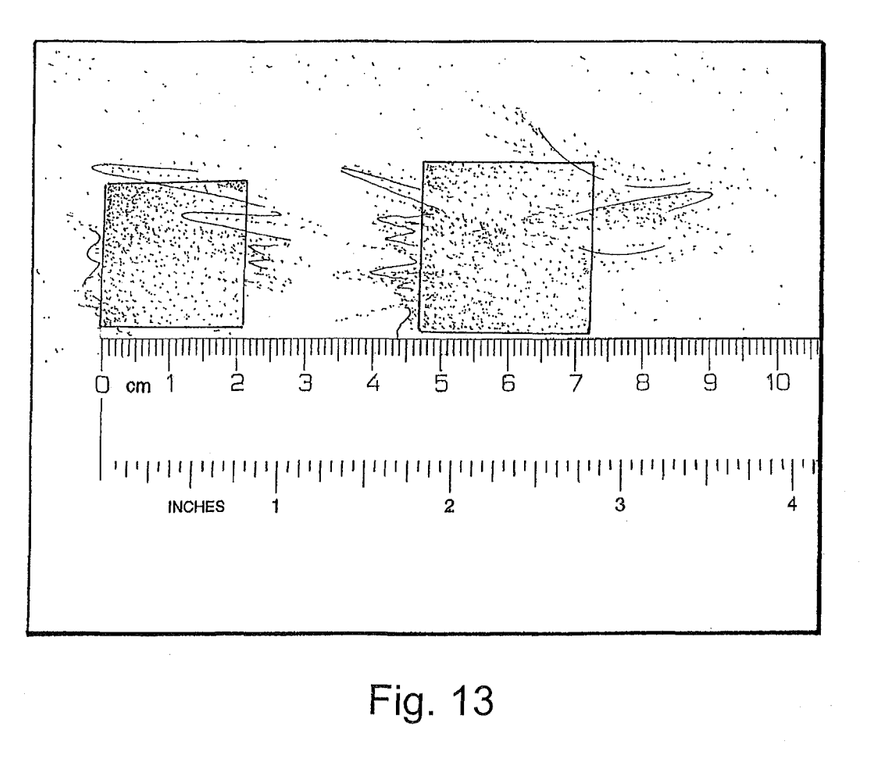
FIG. 13 is a picture of an anode with RuIrOx patches in a checkerboard pattern.

FIG. 12 shows a catalysed CCM with RuIrOx strips and Pt regions in between and FIG. 13 shows the RuIrOx in patches with a checkerboard design. The same designs could be applied when employing iridium or an iridium compound as oxygen evolution reaction catalyst.

Suitable methods for making these structures include:

Coating transfer films (made of PTFE or Kynar, for example) and, with careful alignment, covering the entire area using a second or multiple decal transfer step to fill in the regions where platinum is to be filled in. (See the discussion relating to FIG. 11.) According to this method, the Ir-compound patches are applied by a first decal step, then Pt catalyst is applied by a second decal step in the remaining uncovered regions. Further decal steps are possible.

Coating a roll or coil of a gas diffusion layer (GDL), using two heads which are fed by different ink reservoirs, with wet overlap. In this case, the roll width is wide enough to accommodate the entire cell length to allow for variation in left/right coating zones. Thus, in this method, the GDL is provided in the form of a strip which is rolled up or coiled. It is preferable that the MEA components (and therefore the GDL, for example) are in the form of such rolls or coils in order to laminate and coat them in a continuous process, which serves to reduce the cost. According to this method, the GDL is unrolled from such a roll or coil, and then the catalyst regions are printed on it using two or more print heads, in a continuous process.

Coating a GDL with Pt catalyst in a first step, and subsequently applying the Ir-compound patches onto the first Pt catalyst coating layer, with an interleave and exposed window(s) (that is, a mask) in the desired pattern.

Spots or approximate squares are possible using a gravure coating head with smooth and dimpled regions on the surface of the coating head (and a wiping/doctor blade). Alternatively, the roll coating head could have raised pads appropriately spaced in the desired pattern to create the coated surface regions.

XY ink jet technology to rastor across the membrane or decal transfer in a defined/desired pattern (squares, strips or spots).

Other traditional web coating technologies in combination with the above such as a spraycoating, vapor deposition, electrospray, screenprinting, knife coating, meyer bar to suggest a few.

The pattern can be coated with all methods named above onto the GDL and the membrane and then assembled/bonded together with alignment. For example one pattern on the GDL and the negative pattern on the membrane.

While the invention has been described with reference to example embodiments thereof, it is to be understood that the invention is not limited to the described embodiments or constructions. To the contrary, the invention is intended to cover various modifications and equivalent arrangements. Different embodiments employing the concepts and teachings of the invention will be apparent and obvious to those of ordinary skill in the art and these embodiments are likewise intended to be within the scope of the claims.

What is claimed is:

1. A reversal tolerant anode for a fuel cell which comprises an oxygen evolution reaction catalyst disposed in selected areas of the anode, with only part of the anode structure containing the oxygen evolution reaction catalyst, wherein the selected areas are provided to the surface of the anode according to a predetermined pattern, wherein the predetermined pattern comprises that the selected areas are larger in size the narrower to the anode outlet they are disposed, and wherein the oxygen evolution reaction catalyst is comprised of metallic iridium or an iridium compound.

2. The anode of claim 1, wherein the iridium compound is colloidal metallic iridium or iridium oxide.

3. The anode of claim 1, wherein the metallic iridium or iridium compound is supported on $TiO_2$.

4. The anode of claim 1, wherein the metallic iridium or iridium compound is selected from colloidal metallic iridium or iridium (IV) oxide.

5. The anode of claim 4, wherein the iridium compound is supported on $TiO_2$ metallic iridium or iridium oxide.

6. The anode of claim 1, wherein the iridium compound is colloidal metallic iridium.

7. The anode of claim 1, wherein the iridium compound is iridium oxide.

8. A membrane electrode assembly comprising the anode of claim 1, a cathode, and an electrolyte membrane arranged between the anode and the cathode.

9. The membrane electrode assembly of claim 8, wherein the iridium compound is colloidal metallic iridium or iridium oxide.

10. The membrane electrode assembly of claim 8, wherein the metallic iridium or iridium compound is supported on $TiO_2$.

11. The membrane electrode assembly of claim 8, wherein the metallic iridium or iridium compound is selected from colloidal metallic iridium and iridium (IV) oxide.

12. The membrane electrode assembly of claim 11, wherein the iridium compound is supported on $TiO_2$ metallic iridium or iridium oxide.

13. The membrane electrode assembly of claim 8, wherein the iridium compound is colloidal metallic iridium.

14. The membrane electrode assembly of claim 8, wherein the iridium compound is iridium oxide.

15. A method for preparing a reversal tolerant anode which comprises applying patches of an oxygen evolution reaction catalyst comprised of metallic iridium or an iridium compound to the anode in selected areas of the anode, making the selected areas larger in size the narrower to the anode outlet they are disposed, and then applying a Pt catalyst by filling in the remaining regions of the anode to which the oxygen evolution reaction catalyst was not applied.

16. A method for preparing a reversal tolerant anode which comprises coating a gas diffusion layer of an anode with Pt catalyst, and subsequently applying an oxygen evolution reaction catalyst comprised of metallic iridium or an iridium compound onto the Pt catalyst coating in selected areas of the anode in a predetermined pattern, wherein the predetermined pattern comprises that the selected areas are larger in size the narrower to the anode outlet they are disposed.

* * * * *